US012551845B2

(12) United States Patent
Mclean

(10) Patent No.: US 12,551,845 B2
(45) Date of Patent: Feb. 17, 2026

(54) CARBON CAPTURE DEVICE

(71) Applicant: sequestAir Inc., Minett (CA)

(72) Inventor: John George Bruce Mclean, Minett (CA)

(73) Assignee: SEQUESTAIR INC., Minett (CA)

( * ) Notice: Subject to any disclaimer, the term of this patent is extended or adjusted under 35 U.S.C. 154(b) by 0 days.

(21) Appl. No.: 18/654,430

(22) Filed: May 3, 2024

(65) Prior Publication Data

US 2024/0367101 A1    Nov. 7, 2024

Related U.S. Application Data

(60) Provisional application No. 63/464,037, filed on May 4, 2023.

(51) Int. Cl.
*B01D 53/00*     (2006.01)
*B01D 53/60*     (2006.01)
*B01D 53/62*     (2006.01)

(52) U.S. Cl.
CPC ............. *B01D 53/62* (2013.01); *B01D 53/60* (2013.01); *B01D 2251/402* (2013.01); *B01D 2257/302* (2013.01); *B01D 2257/404* (2013.01); *B01D 2257/504* (2013.01); *B01D 2258/0283* (2013.01)

(58) Field of Classification Search
CPC .. B01D 53/62; B01D 53/60; B01D 2251/402; B01D 2257/302; B01D 2257/404; B01D 2257/504; B01D 2258/0283
USPC .......................................................... 96/121
See application file for complete search history.

(56) References Cited

U.S. PATENT DOCUMENTS

| 3,706,601 | A | * | 12/1972 | Strier | ...................... | H01M 4/26 |
| | | | | | | 264/104 |
| 3,715,869 | A | * | 2/1973 | Holden | .............. | B01D 39/2062 |
| | | | | | | 502/402 |
| 6,833,023 | B1 | * | 12/2004 | Vandenberghe | ....... | B01D 50/20 |
| | | | | | | 55/498 |
| 2010/0221163 | A1 | | 9/2010 | DaCosta et al. | | |

(Continued)

FOREIGN PATENT DOCUMENTS

WO    WO-2017095765 A1 * 6/2017 ............. B01D 53/62

OTHER PUBLICATIONS

Mcqueen, Noah, et al. "Ambient weathering of magnesium oxide for CO2 removal from air." Nature Communications 11.1 (2020): 3299.

(Continued)

*Primary Examiner* — T. Bennett McKenzie
(74) *Attorney, Agent, or Firm* — Perry + Currier Inc.

(57) ABSTRACT

The present specification relates to a carbon capture apparatus designed to sequester carbon dioxide (CO2) from exhaust gases emitted by residential or commercial sources. This apparatus includes at least one channel formed from olivine. Each channel has a proximal opening positioned near an emissions flue to receive the exhaust gases. As the gases traverse through the olivine channels, CO2 is absorbed and sequestered, significantly reducing its concentration in the exiting gases. The apparatus can feature multiple configurations, including cylindrical or hexagonal channels, and may incorporate a shroud to ensure a sealed interface with the flue. This design allows for effective retrofitting to existing structures and contributes to greenhouse gas mitigation efforts.

19 Claims, 18 Drawing Sheets

(56) References Cited

U.S. PATENT DOCUMENTS

| | | | | |
|---|---|---|---|---|
| 2012/0102932 A1* | 5/2012 | Mitsuda | ............... | F01N 3/0211 |
| | | | | 60/311 |
| 2012/0131973 A1* | 5/2012 | Greenidge | ............... | B01J 20/10 |
| | | | | 423/430 |
| 2012/0318135 A1* | 12/2012 | Hoglund | ................. | F24F 11/39 |
| | | | | 95/1 |
| 2018/0212769 A1* | 7/2018 | Novak | .................... | G06F 21/53 |
| 2019/0389778 A1* | 12/2019 | Campbell | ............ | B01D 53/025 |
| 2020/0114310 A1* | 4/2020 | Gerlach | ............ | B01D 53/0407 |
| 2021/0349065 A1* | 11/2021 | Masoudi | ................ | B01D 53/62 |
| 2021/0358731 A1* | 11/2021 | Wu | ....................... | H01J 49/105 |
| 2023/0038447 A1* | 2/2023 | Hasan | ................... | E21B 43/164 |
| 2023/0136157 A1* | 5/2023 | Zock | ....................... | D04B 1/22 |
| | | | | 210/497.01 |

OTHER PUBLICATIONS

Weingart, Eden, How does Carbon Capture Work?, Mar. 19, 2023, New York Times, URL: https://www.nytimes.com/interactive/2023/03/19/us/carbon-capture.html, Retrieved from the Wayback Machine on Jul. 31, 2024 from URL: https://web.archive.org/web/20230321010135/https://www.nytimes.com/interactive/2023/03/19/us/carbon-capture.html.

Hartmann, J., et al. "Enhanced chemical weathering as a geoengineering strategy to reduce atmospheric carbon dioxide, supply nutrients, and mitigate ocean acidification." Rev. Geophys 51 (2013): 113-149.

* cited by examiner

CARBON CAPTURE DEVICE

PRIORITY CLAIM

The present specification claims priority from U.S. provisional patent application 63/464,037 filed May 4, 2023, the contents of which are incorporated herein by reference.

FIELD

The present specification relates generally to carbon capture technology.

BACKGROUND

The challenge of reducing greenhouse gas (GHG) emissions from residential sources is a significant and growing concern in the context of global climate change. Residential buildings are a substantial contributor to GHG emissions, primarily due to their use of fossil fuels for heating, cooling, and electricity, as well as emissions from household waste. The urgency to mitigate these emissions is heightened by the increasing global population and the expansion of residential areas, which inherently leads to greater energy consumption and consequently higher GHG emissions.

A major challenge in addressing residential GHG emissions is the diversity and individuality of residential structures, ranging from single-family houses to multi-unit dwellings, each with unique energy needs and consumption patterns. This variability makes it difficult to implement a one-size-fits-all solution. Furthermore, existing residential buildings, especially older ones, often lack energy efficiency due to outdated construction practices and materials. Retrofitting these structures with energy-efficient technologies can be costly and complex, posing a significant barrier for houseowners and landlords.

Another challenge is the reliance on traditional energy grids, which predominantly use fossil fuels. Transitioning to renewable energy sources, such as solar or wind power, requires substantial investments and infrastructural changes. The upfront costs and logistical complexities associated with installing renewable energy systems in residential settings are considerable deterrents for many houseowners.

Additionally, the behavior and awareness of residents play a crucial role in GHG emissions. Many individuals lack awareness or understanding of how their daily activities contribute to emissions, and even when aware, may not have access to practical and affordable ways to reduce their carbon footprint.

SUMMARY

A first aspect of the specification provides a carbon sequestering member comprising: At least one channel having a proximal opening for placement proximal to a flue, with an overall diameter that is complementary to the diameter of the flue; the proximal opening receives exhaust gases. The at least one channel is formed of olivine, such that $CO_2$ traveling along the channel is sequestered by the olivine, and exhaust gases exiting through a distal opening opposite the proximal opening have reduced $CO_2$ concentration.

The sequestering member may comprise at least three cylindrical channels.

Alternatively, the sequestering member may comprise a plurality of hexagonal channels.

Additionally, the sequestering member may include a shroud to create a substantially sealed communication channel between the flue and the proximal opening.

The shroud may include a base for attaching the shroud to a wall through which the flue exits.

The base may include vibration dampening materials to reduce the transmission of mechanical vibrations from the flue to the sequestering member.

The olivine may include additional chemical binders to increase its $CO_2$ sequestration capacity.

The olivine may include as at least one of Magnesium Oxide and Magnesium Chloride as a chemical binder to create a solid structure and/or to increase $CO_2$ sequestration.

A moisture retention system may be integrated into the channel to enhance the weathering process of the olivine.

The channel may include internal structures or coatings that increase the surface area available for $CO_2$ interaction with the olivine.

The overall diameter of the channel may be adjustable to accommodate flues of different sizes.

A sensor may be included for detecting blockages within the sequestering member.

The distal opening may include a filter or catalyst to further reduce pollutants in the exhaust gases other than $CO_2$.

The sequestering member may be additionally configured to sequester pollutants other than $CO_2$, including at least one of nitrogen oxides, sulfur oxides, or particulates.

The channel may be modular, allowing for the connection of multiple channels to increase the sequestration capacity.

A second aspect of the specification provides a method of sequestering carbon dioxide ($CO_2$) from exhaust gases emitted by a combustion source, comprising:

Positioning a carbon sequestering member proximal to a flue of the combustion source, wherein the sequestering member comprises at least one channel formed of olivine.

Directing exhaust gases into a proximal opening of the at least one channel, where the proximal opening has an overall diameter complementary to the diameter of the flue.

Conducting the exhaust gases through the at least one channel where the $CO_2$ is sequestered by the olivine.

Expelling the exhaust gases through a distal opening of the at least one channel, wherein the expelled gases have a reduced $CO_2$ concentration.

The method may further comprise adjusting the overall diameter of the proximal opening to optimize the flow of exhaust gases into the at least one channel.

The at least one channel may be porous to augment interaction between the olivine and the $CO_2$ in the exhaust gases.

The carbon sequestering member may include multiple channels configured in either cylindrical or hexagonal shapes, and the method involves selecting a configuration based on the expected volume of exhaust gases.

The method may further include integrating a shroud around the proximal opening to create a substantially sealed communication channel between the flue and the proximal opening.

An aspect of the specification provides a device for sequestering carbon dioxide ($CO_2$) emissions from sources comprising a series of tubes or channels formed from Neosilicate and a binding agent, enabling $CO_2$ sequestration through weathering.

After a period of time performing the sequestration function, the device can be repurposed and integrated into the ingredients for the composition of a concrete mix. Thus sequestered $CO_2$ can be utilized in the enhancement of the creation of concrete and not require the underground storage of the sequestered CO2 while also supporting the CO2 intensive process of manufacturing concrete with some greenhouse gas mitigation.

The device can be attached to the emissions vent or pipe or flue in such a way to reduce the likelihood of blockage of the original emissions vent while utilizing the momentum of the exhaust gas to drive it into the device.

An aspect of the specification provides a carbon sequestering member including: at least one channel having an proximal opening for placement proximal to a flue and an overall diameter that is greater than a diameter of the flue; the proximal opening for receiving exhaust gases; the at least one channel being formed of olivine, such that CO2 traveling along the channel is sequestered by the olivine and exhaust gases exiting through a distal opening opposite the proximal opening have reduced CO2.

An aspect of the specification provides a carbon sequestering member wherein the olivine is porous.

An aspect of the specification provides a carbon sequestering member including at least three cylindrical channels.

An aspect of the specification provides a carbon sequestering member including a plurality of hexagonal channels.

An aspect of the specification provides a carbon sequestering member further including a shroud for creating a substantially sealed communication channel between the flue and the proximal opening.

An aspect of the specification provides a carbon sequestering member wherein the shroud includes a base for attaching the shroud to a wall through which the flue exits.

DESCRIPTION

Figure 1:
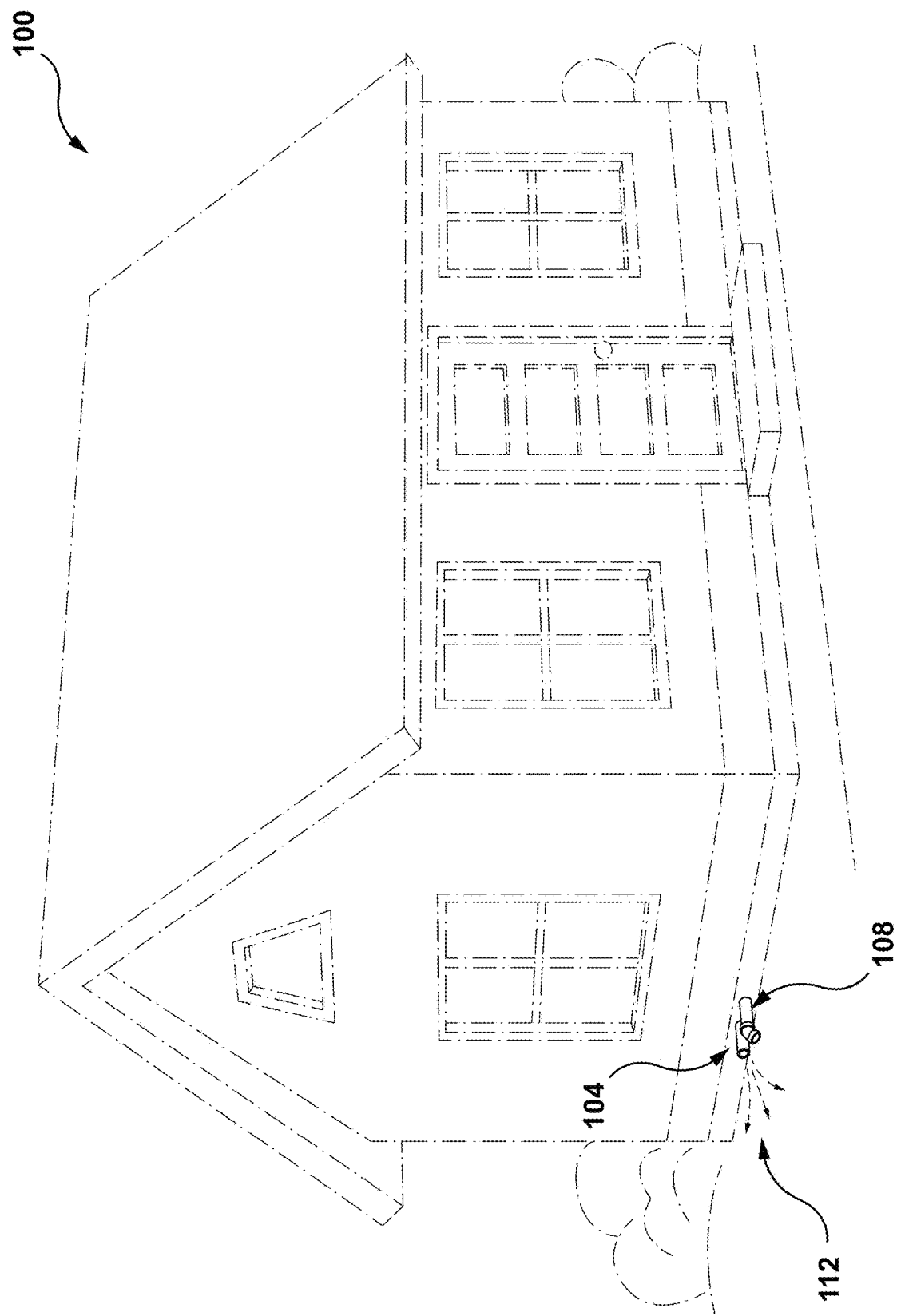
FIG. 1 shows a perspective view of a residential house with a flue and air intake.

FIG. 1 shows a detached residential house 100. House 100 is shown with a flue 104. Flue 104 is shown beside an air intake 108. Flue 104 can be associated with any combustion appliance (not shown) that might be commonly found in house 100. Air intake 108 may be provided to draw in clean air into the combustion chamber of the combustion appliance. Ideally, air intake 108 is situated so as not to draw exhaust gases 112 emitted by flue 104.

Examples of combustion appliances include furnaces, water heaters, clothes dryers, and ovens, which generate heat through combustion of fuels rather than electricity. These appliances are commonly fueled by natural gas, propane, kerosene, oil, wood, pellets, coal, and various biofuels such as biodiesel and ethanol. Other types of fuels known to those skilled in the art may also be used. Combustion appliances produce exhaust gases 112, which are byproducts of fuel combustion. These gases typically consist of water vapor ($H_2O$), carbon dioxide ($CO_2$), nitrogen ($N_2$), oxygen ($O_2$), carbon monoxide (CO), nitrogen oxides (NOx), sulfur oxides (SOx), and particulates or ash. The present specification has application to any flue 104 emitting gases that include at least CO2.

Figure 2:
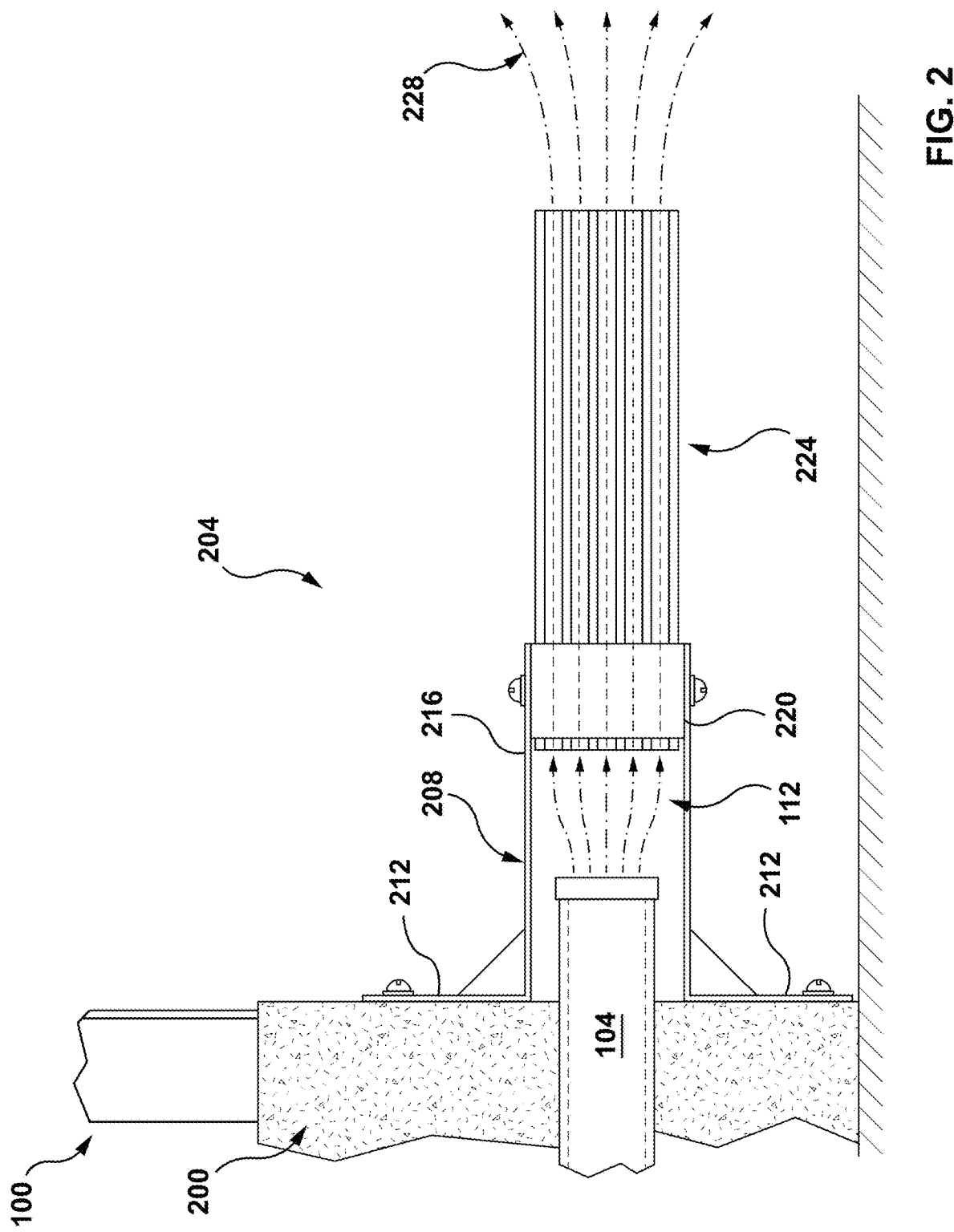
FIG. 2 is a side-sectional view of the house of FIG. 1 with a sequestering member proximal to a flue.

FIG. 2 is a side-sectional view of a wall 200 of house 100 through which flue 104 passes from the interior of house 100 to its exterior. FIG. 2 also shows a carbon capture apparatus 204 affixed to the exterior of wall 200. In general, apparatus 204 is designed to retrofit to house 100.

Apparatus 204 includes a shroud 208 that includes a base 212 that is affixed to wall 200. The body 216 of shroud 208 extends away from wall 200. In the present example embodiment, body 216 is normal to wall 200, but a ninety degree angle may not be necessary. Body 216 coaxially surrounds flue 104 along the extent of flue 104 running from wall 200 and beyond the distal tip of flue 104.

The distal tip of shroud 208 includes a collar 220 which supports a sequestering member 224. Sequestering member 224 is configured to receive exhaust gases 112 and trap carbon dioxide along its length, expelling carbon-reduced gases 228.

Referring now to FIG. 3 through FIG. 7, sequestering member 224 is shown in greater detail.

Figure 3:
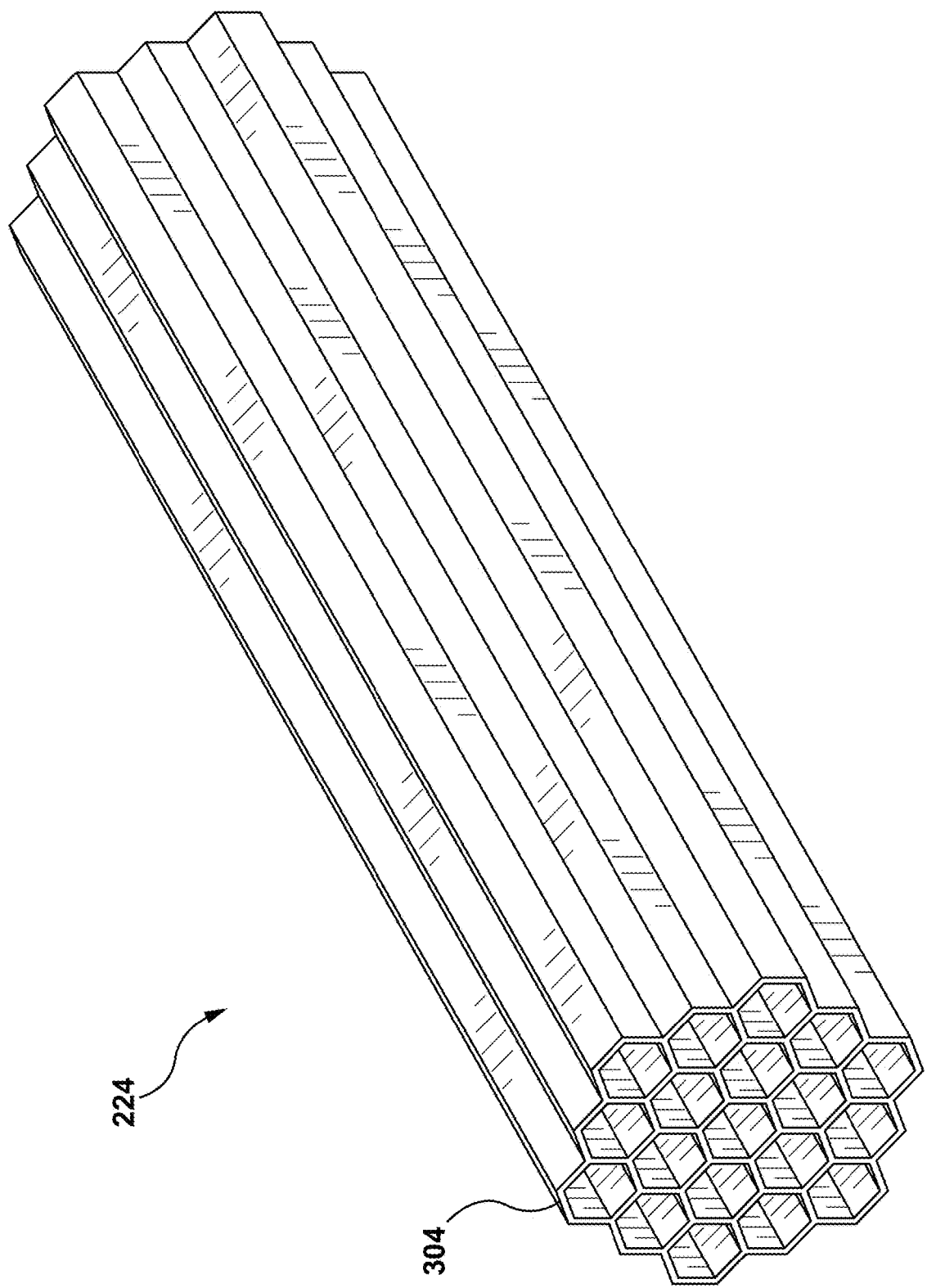
FIG. 3 is a perspective view of a sequestering member from FIG. 2.
Figure 4:
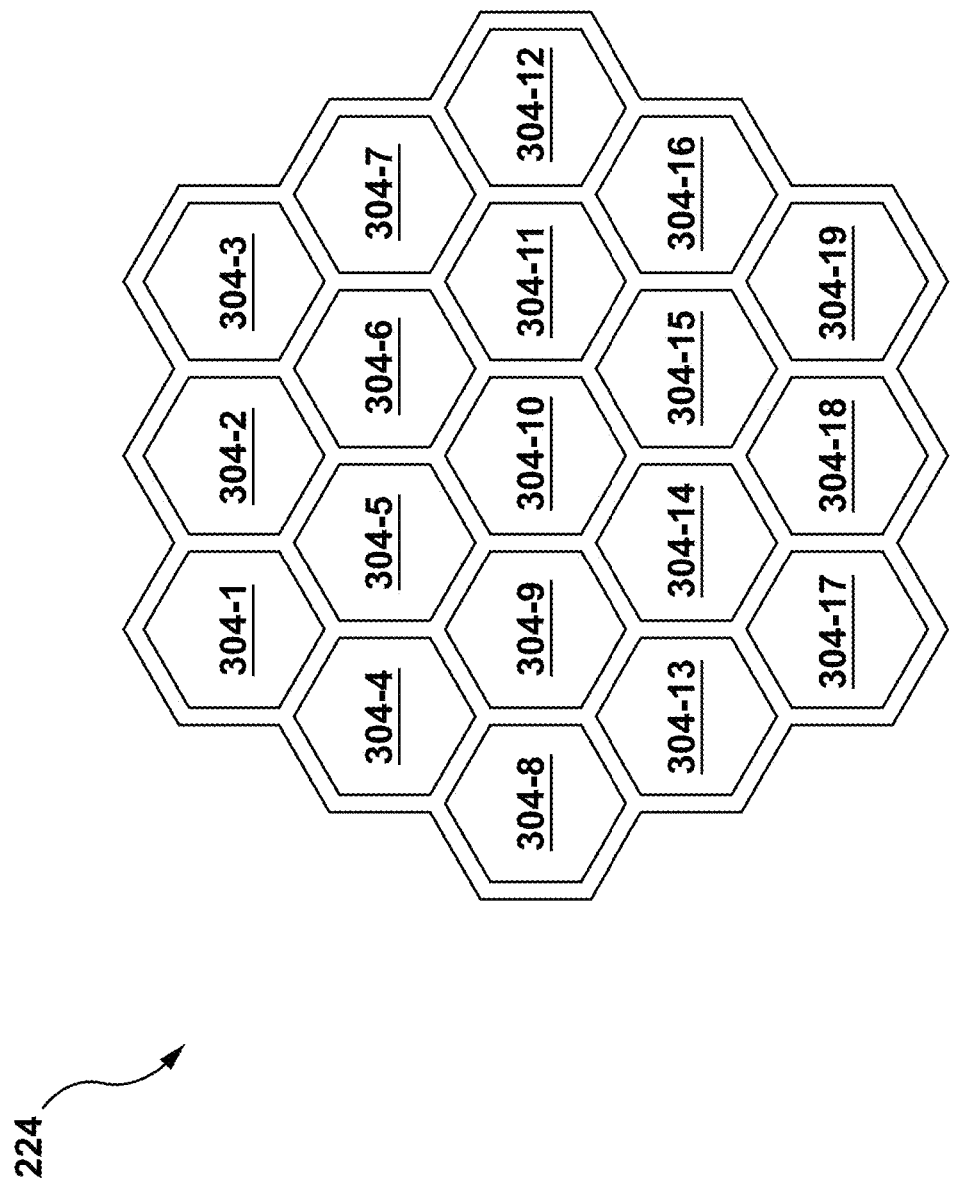
FIG. 4 is an end view of the sequestering member of FIG. 3.
Figure 5:
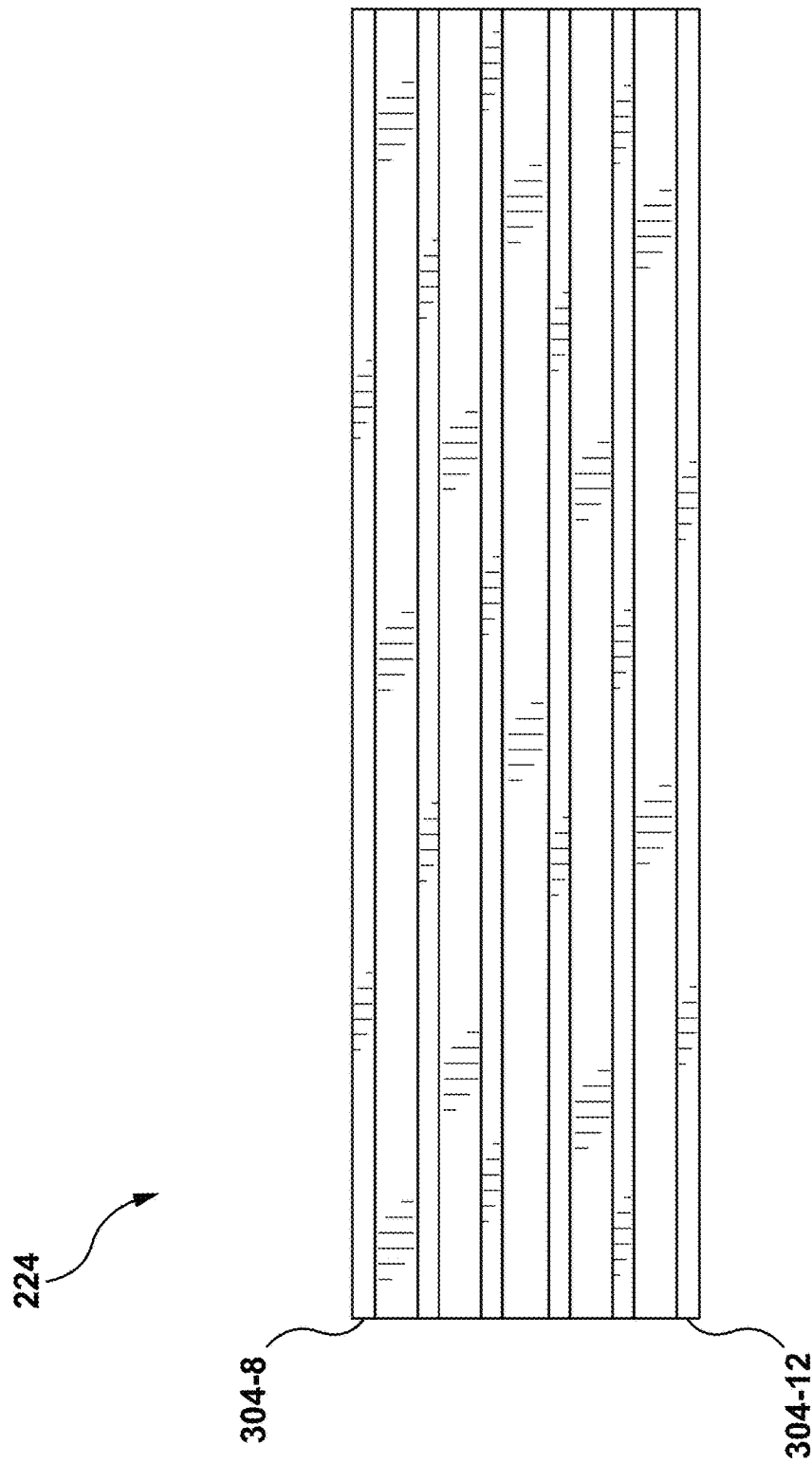
FIG. 5 is a top view of the sequestering member.
Figure 6:
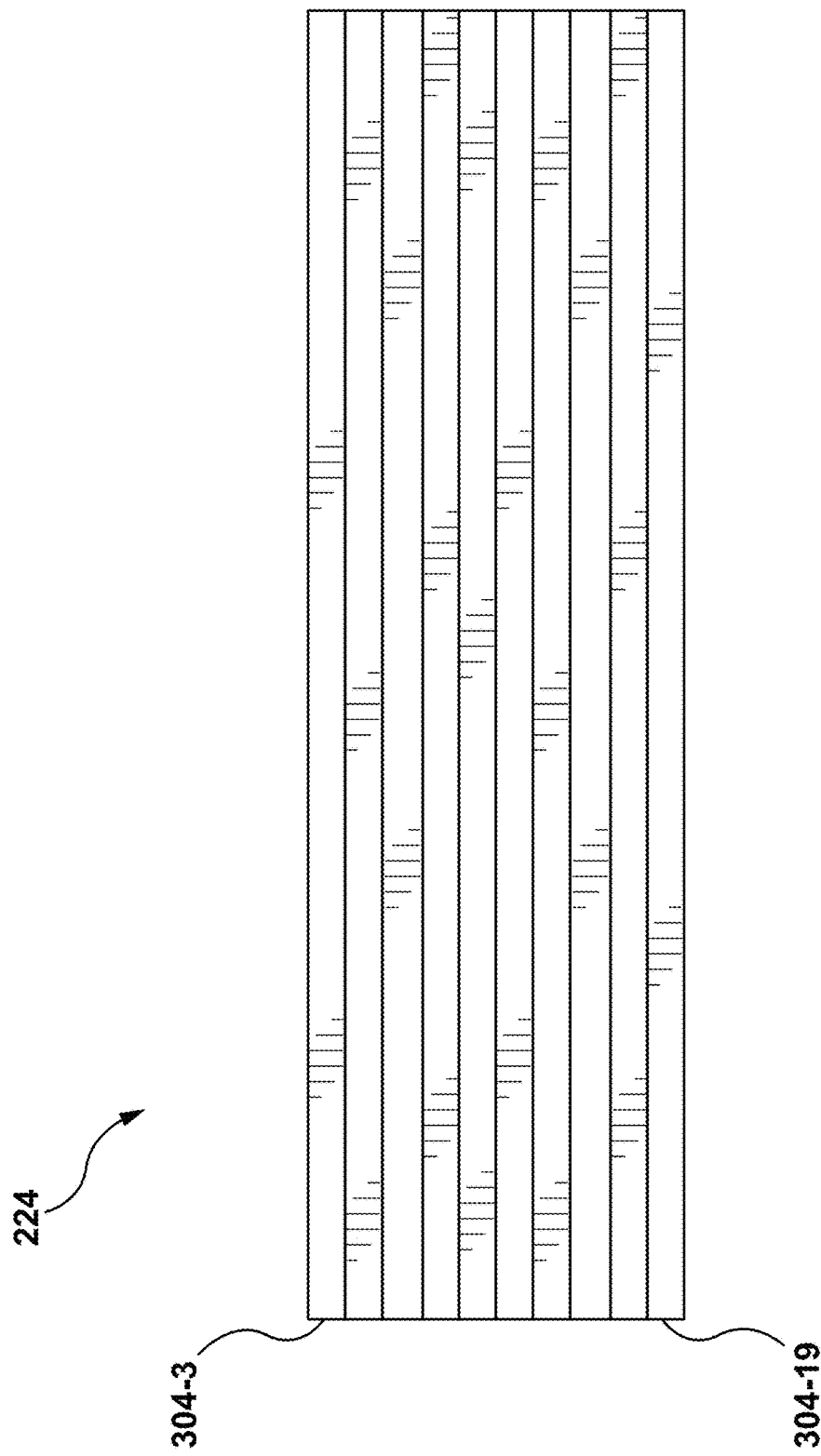
FIG. 6 is a right-side elevation view of the sequestering member.
Figure 7:
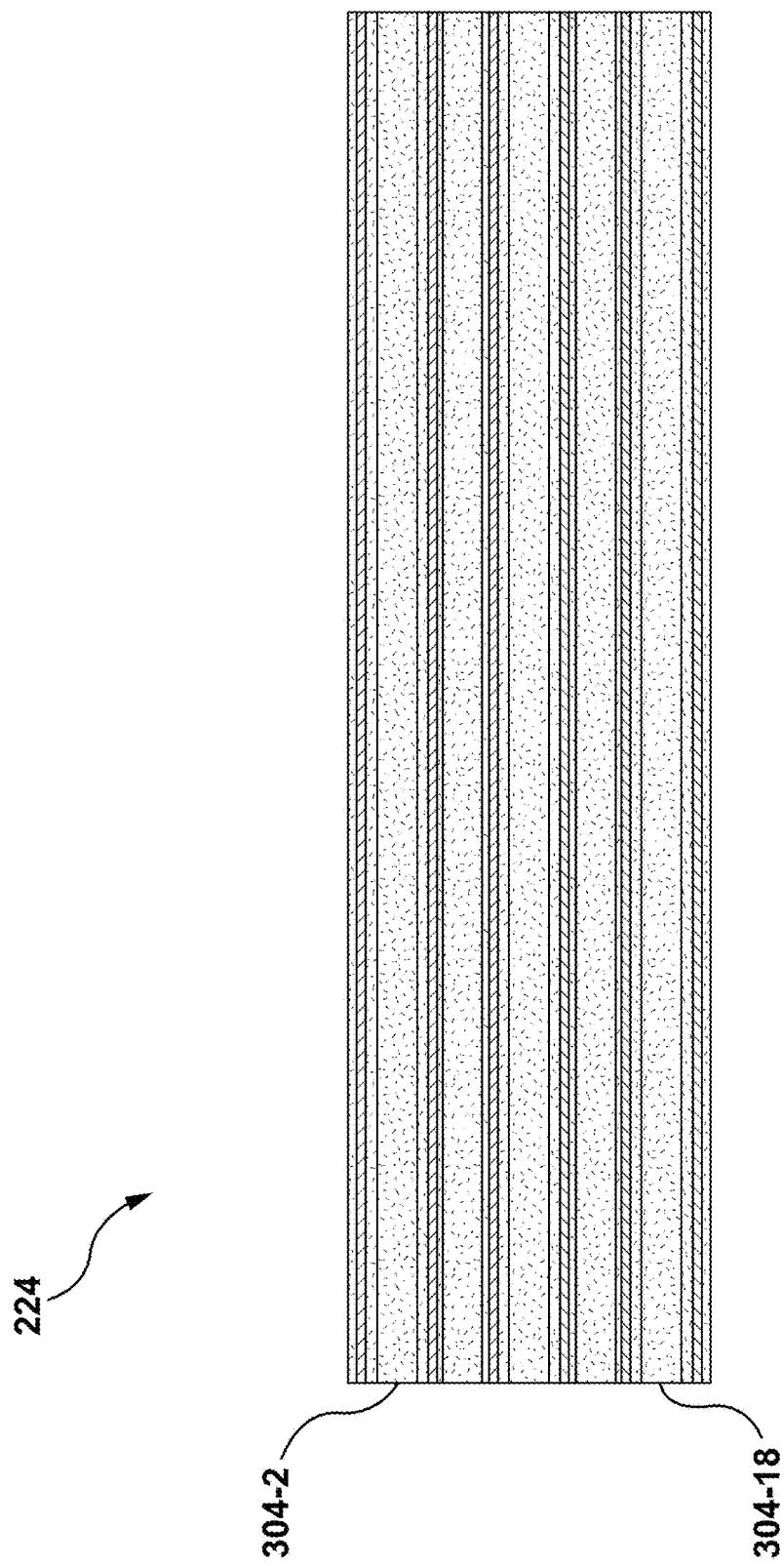
FIG. 7 is a right-side sectional view of the sequestering member.

FIG. 3 is a perspective view of sequestering member 224, showing a plurality of channels 304. FIG. 4 is an end view of the sequestering member 224, where nineteen separate channels 304-1, 304-2, 304-3, . . . 304-19 are independently labelled. (Generically these are referred to as channel 304, and collectively as channels 304.) Not every channel 304 is independently or completely labelled in every Figure. FIG. 5 is a top view of sequestering member 224. FIG. 6 is a right-side elevation view of sequestering member 224. FIG. 7 is a right-side sectional view of sequestering member 224.

In a presently preferred embodiment, sequestering member 224 is made from any carbon sequestering material, but in a presently preferred embodiment is made from olivine, a group of silicate minerals with the general formula $(Mg, Fe)_2SiO_4$.

Each channel 304 is semi-porous, meaning that exhaust gases 112 can not only travel through sequestering member 224 to the distal exit, but also that gases 112 can be absorbed laterally by the walls of each channel 304. More particularly, due to olivine's unique characteristics, CO2 within gases 112 are absorbed into the walls of each channel 304, thus resulting in the expulsion of carbon-reduced gases 228. In other words, the amount of CO2 within carbon-reduced gases 228 is less than the amount of CO2 in exhaust gases 112.

Thus member 224 is provided as an apparatus for retaining carbon dioxide (CO2) through sequestration of fossil fuel emissions created by the burning of such fuels to generate heat or power. Member 224 can be broadly applied, but may have a particular value in non-institutional applications, such as residences or small commercial buildings. The flow of exhaust gases 112 through member 224 can be assisted by a fan, but this is not necessarily as the existing momentum of exhaust gases 112 corresponding to the appropriate dimensioning of channels 304 can be sufficient to drive exhaust gases 112 through sequestering member 224.

As noted above, channels 304 (or chambers) can be silicate based multi-chamber device built from a Neosilicate and infused with Magnesium Oxide as a binding agent. Both types of Olivine (Neosilicate) and Magnesium Oxide have been proven to be capable of sequestering CO2. The speed of sequestration is variable upon the surface area of the interior of each channel 304 that is exposed to the exhaust gases 112 as well as the weathering of the invention-exposure to the physical elements found outside in nature (sun, rain, snow, ph-levels).

By utilizing techniques to bind the required olivine silica or sand at very small grain sizes into a structure containing multiple channels 304 (or chambers) such as the hexagonal shape of honeycomb; the channels 304 can have a significant surface for the sequestration function. The increased surface area can provide for greater sequestration of Carbon as the surface area is directly correlated with the amount sequestered. Sequestering member 224 is thus designed to be a carbon capture device that can be produced on mass scale, installed at the location of emissions.

The absence of a fan, while still drawing exhaust gases 112 through sequestering member 224, can be assisted by Bernoulli's principle. This principle dictates that an increase in the velocity of a fluid stream results in a decrease in pressure. The exhaust vent, discharge, or flue 104—currently used for emissions generated by burning fossil fuels—has a defined diameter or size. In certain embodiments, it may be preferable not to attach sequestering member 224 directly to the current exhaust or flue 104 due to potential blockages from weather events, insects, or animals, creating a safety hazard. Instead, sequestering member 224 can be indirectly attached to the current discharge, allowing for adequate space should the device become blocked. This setup permits sequestering member 224 to have a greater circumference than the existing flue 104, enabling the application of Bernoulli's principle. As a result, exhaust gases 112 will travel from flue 104 into sequestering member 224, covering a distance and entering a dimension larger than flue 104. This configuration allows the exhaust gases 112 to increase in velocity as they enter the sequestering member 224 due to the resulting reduction in pressure.

Figure 8:
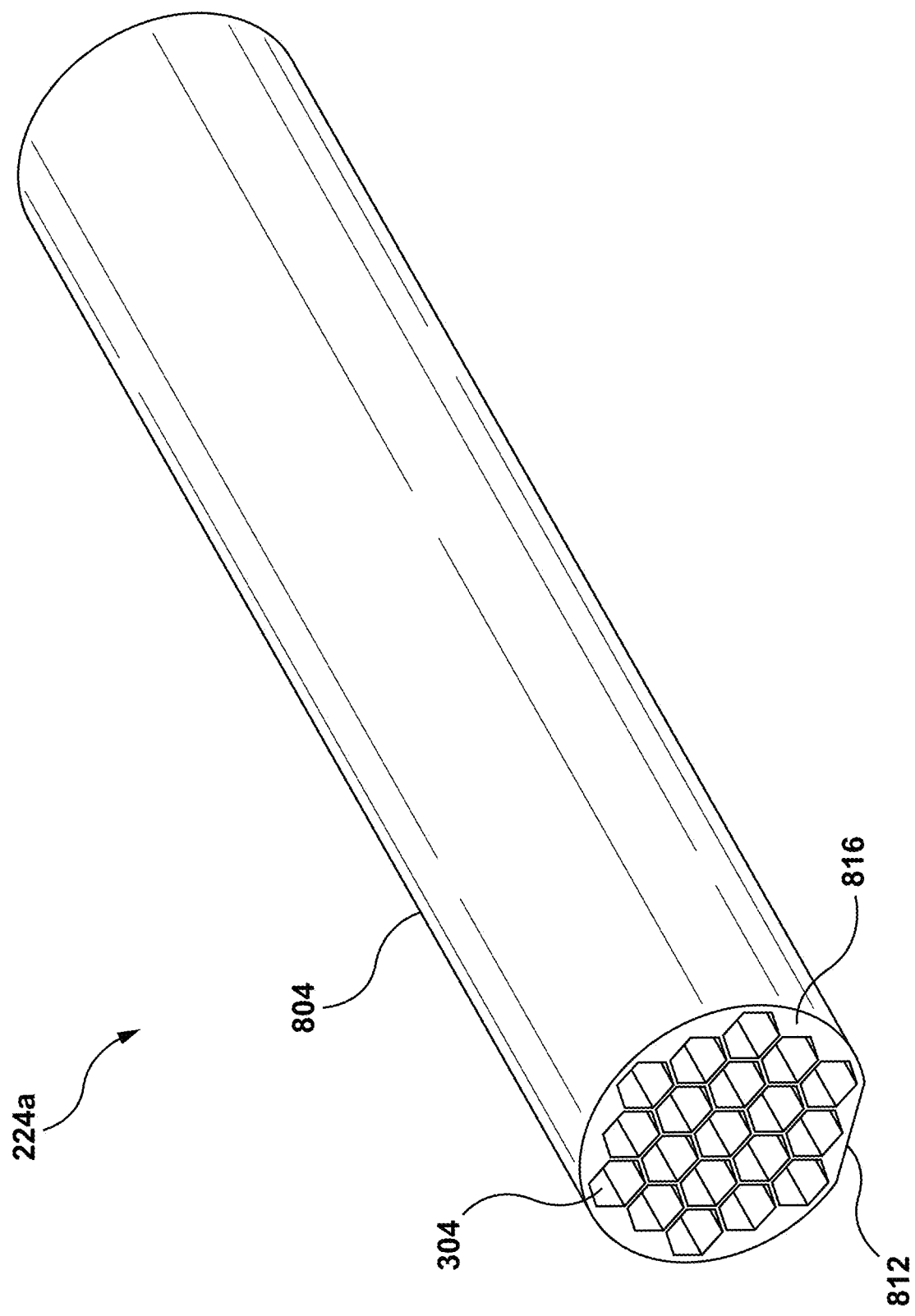
FIG. 8 shows a perspective view of another sequestering member.

While the foregoing discusses certain embodiments, it is to be understood that variations, combinations, and/or subsets of those embodiments are contemplated. For example, many variations on sequestering member 224 are contemplated. FIG. 8 shows another sequestering member 224a. Sequestering member 224a is a variant on sequestering member 224 and thus they carry like references, except followed by the suffix "a". Sequestering member 224a and also includes channels 304 at the core. However, sequestering member 224 has an outer cylindrical wall 804 and a flat terminal edge 812. The volume between the outer chambers 304 and wall 804 constitutes a solidified periphery 816.

Figure 9:
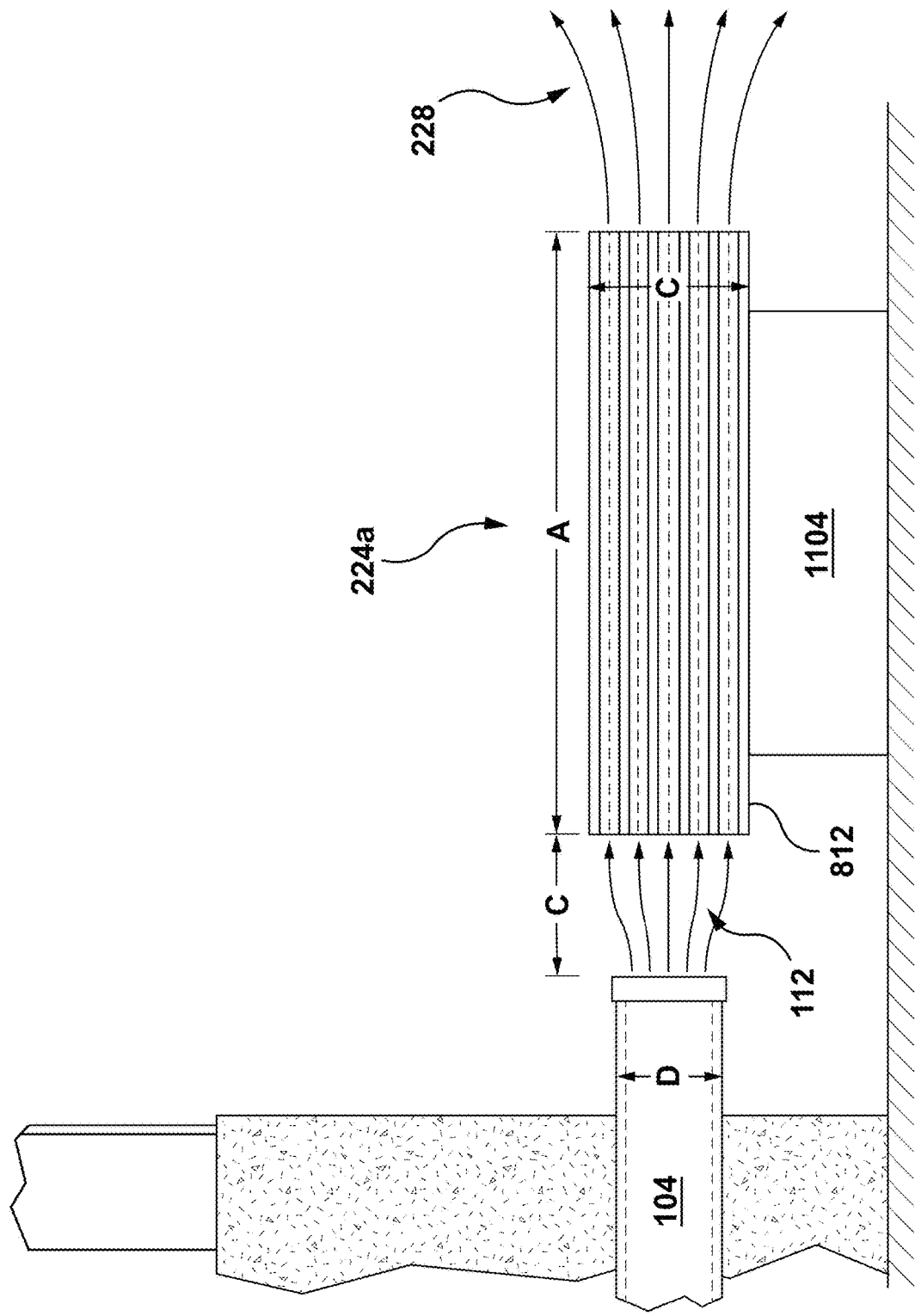
FIG. 9 shows the variant sequestering member of FIG. 8 situated in front of flue.

FIG. 9 illustrates the variant sequestering member 224a positioned in front of flue 104. The flat terminal edge 812 of the sequestering member rests on a base 1104. Notably absent in this figure is shroud 208, which has been intentionally omitted. The absence of shroud 208 may allow for some exhaust gases 112 to escape prior to entering sequestering member 224a; however, this design is intentional to prevent potential blockage issues. The engineered spacing-Dimension "C"-between flue 104 and sequestering member 224a ensures that even without the shroud, a substantial portion of exhaust gases 112 is channeled effectively into the sequestering member.

Dimension "A" represents the length of sequestering member 224a, a critical measurement that corresponds to the time exhaust gases spend within the member, thus affecting the sequestration process's efficiency. The greater the length "A", the more extended the interaction of exhaust gases with the olivine channels, enhancing CO2 absorption.

Dimension "B" defines the outer diameter of sequestering member 224a. This dimension is larger than Dimension "D"—the diameter of flue 104—to exploit the principles of Bernoulli's theorem. By designing sequestering member 224a with a larger outer diameter, the velocity of exhaust gases increases as they move into the wider area of the sequestering member, which according to Bernoulli's principle, results in decreased pressure and facilitates the drawing in of gases.

Dimension "D" is the actual diameter of the flue 104, which is a fixed parameter and determines the initial volume and speed of exhaust gases exiting the combustion source. The comparison between Dimension "B" and Dimension "D" is crucial for ensuring the appropriate increase in gas velocity and the subsequent decrease in pressure necessary for optimal gas entry into sequestering member 224a.

By choosing the dimensions "A" and "B" to be larger than Dimension "D" and configuring Dimension "C" to provide a strategic gap, the design of sequestering member 224a optimizes the intake of exhaust gases 112, ensuring effective carbon sequestration while also addressing potential safety concerns related to flue blockages.

Figure 10:
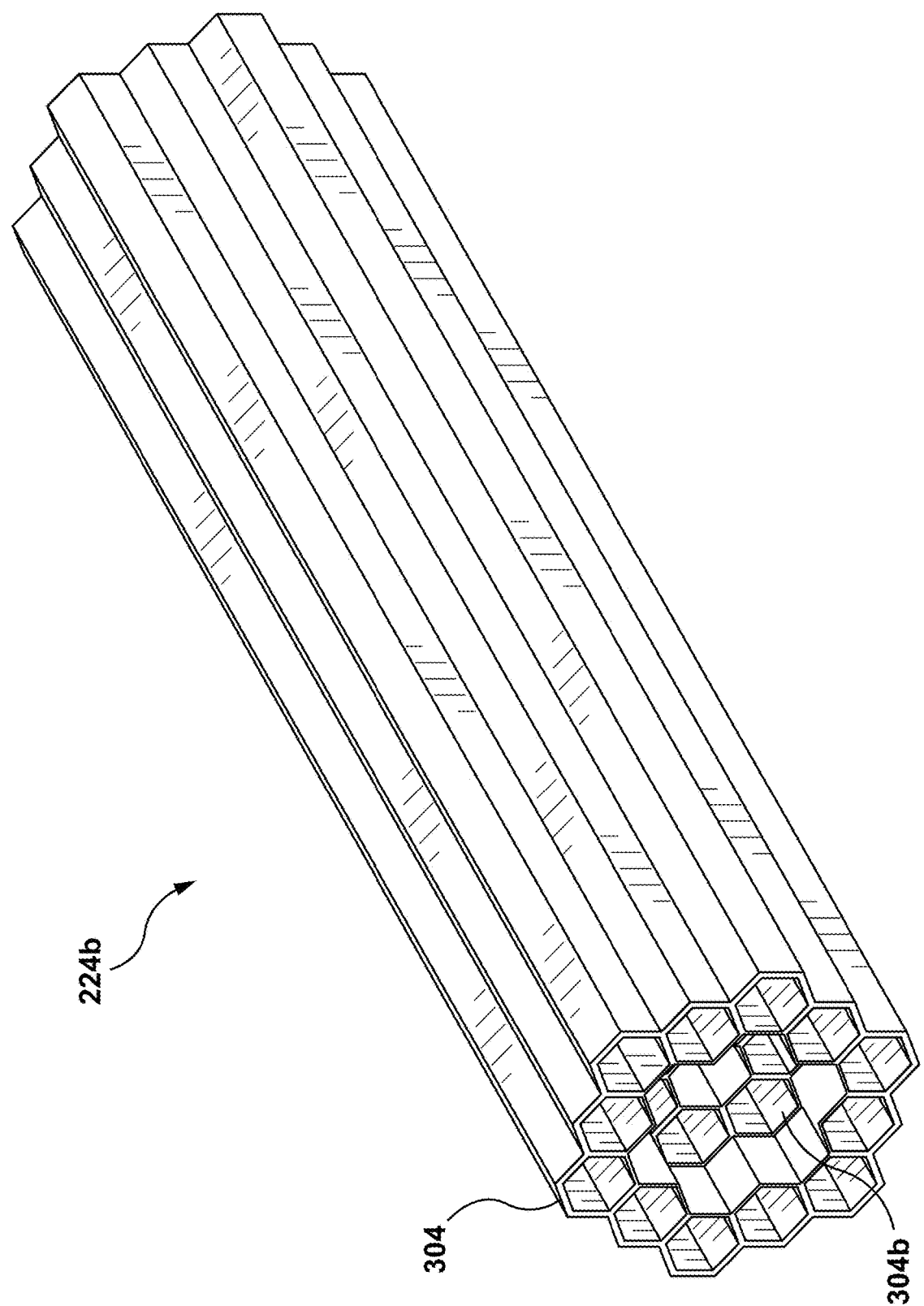
FIG. 10 shows a perspective view of another sequestering member.
Figure 11:
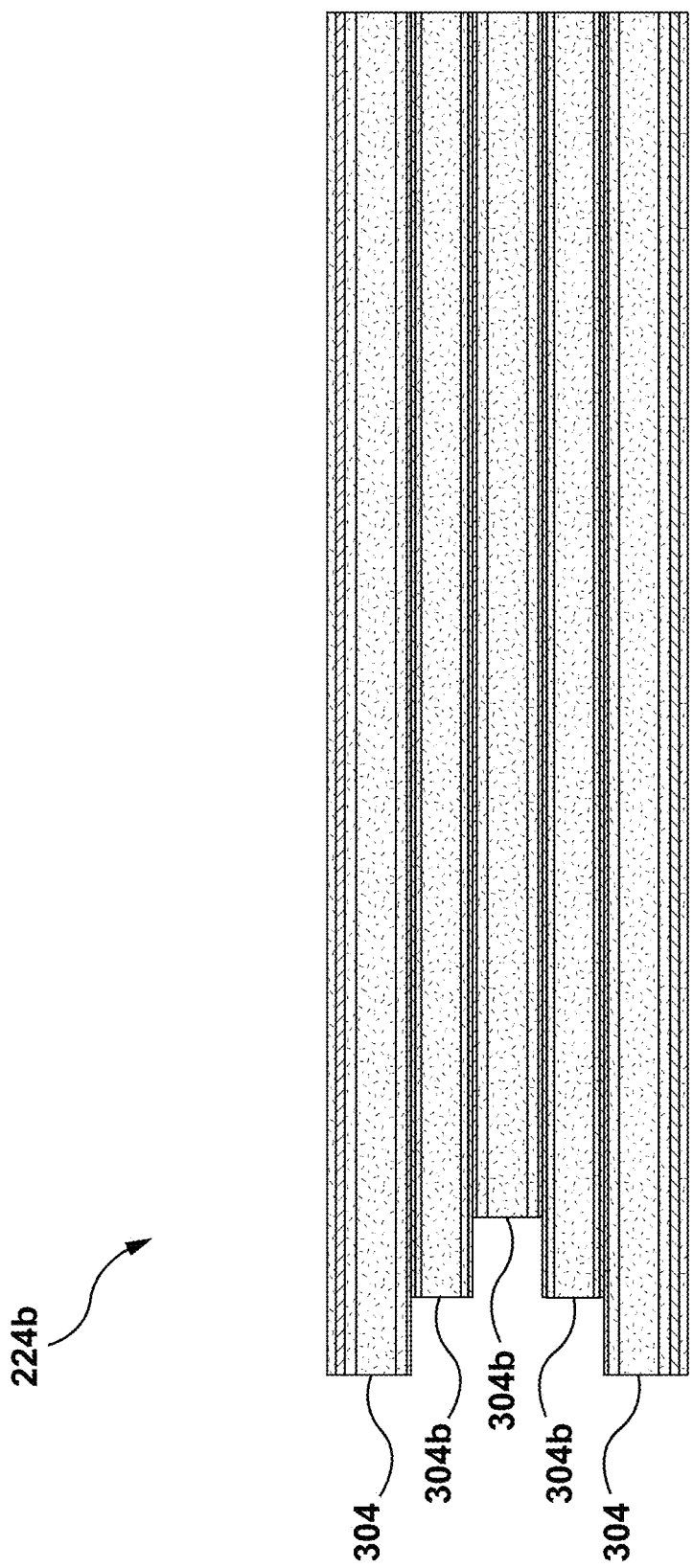
FIG. 11 shows a side sectional view of the sequestering member of FIG. 10.

As noted, many variations on sequestering member 224 are contemplated. FIG. 10 shows perspective view of another sequestering member 224b. FIG. 11 shows a side sectional view of the sequestering member 224b of FIG. 10. As best seen in FIG. 11, sequestering member 224b includes central channels 304b that are recessed at one in relation to the peripheral channels 304. The recessed central channels 304b can help draw in exhaust gases 112 to improve efficiency of sequestering member 224b.

Figure 12:
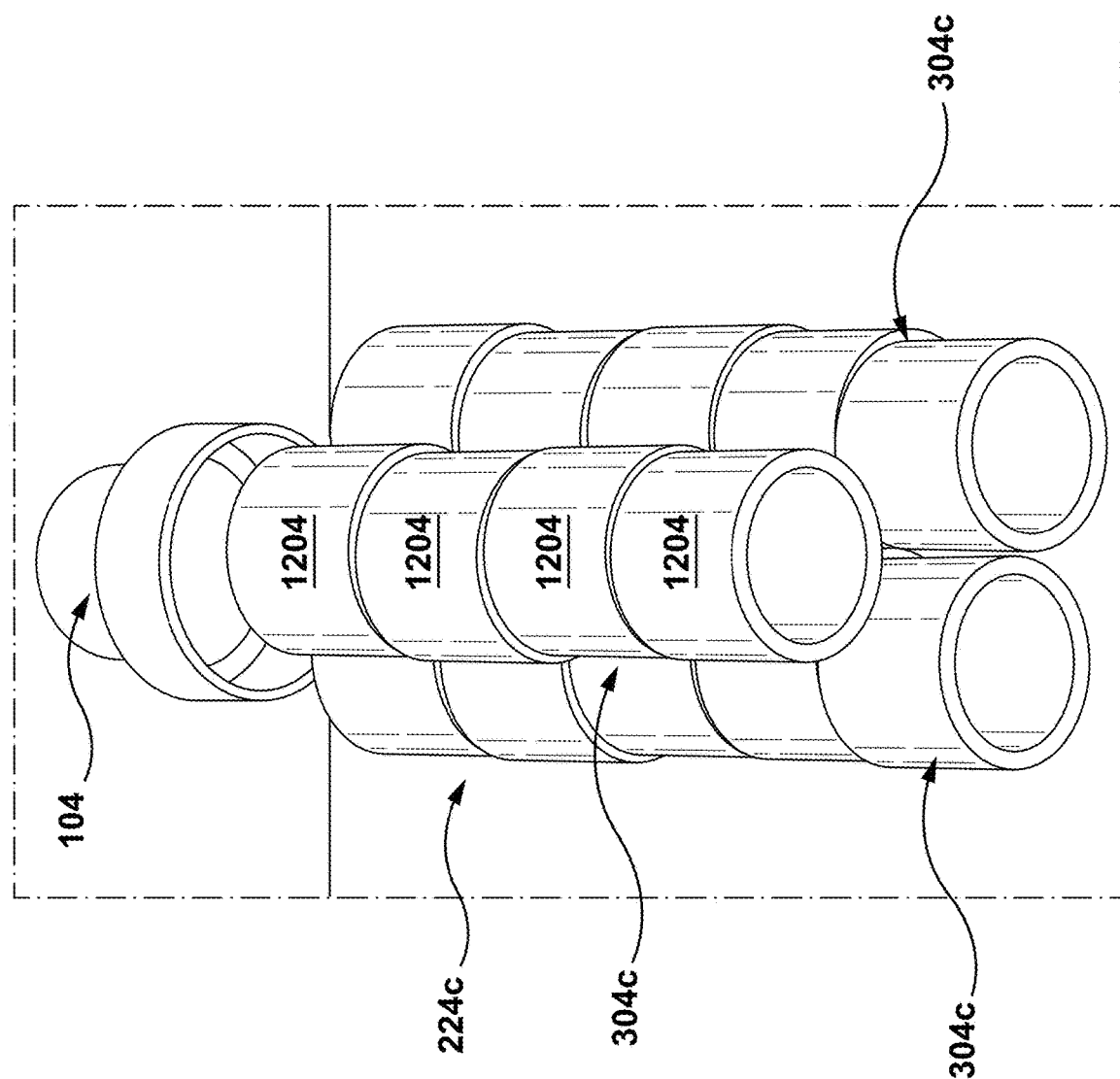
FIG. 12 shows another variant of the sequestering member.
Figure 13:
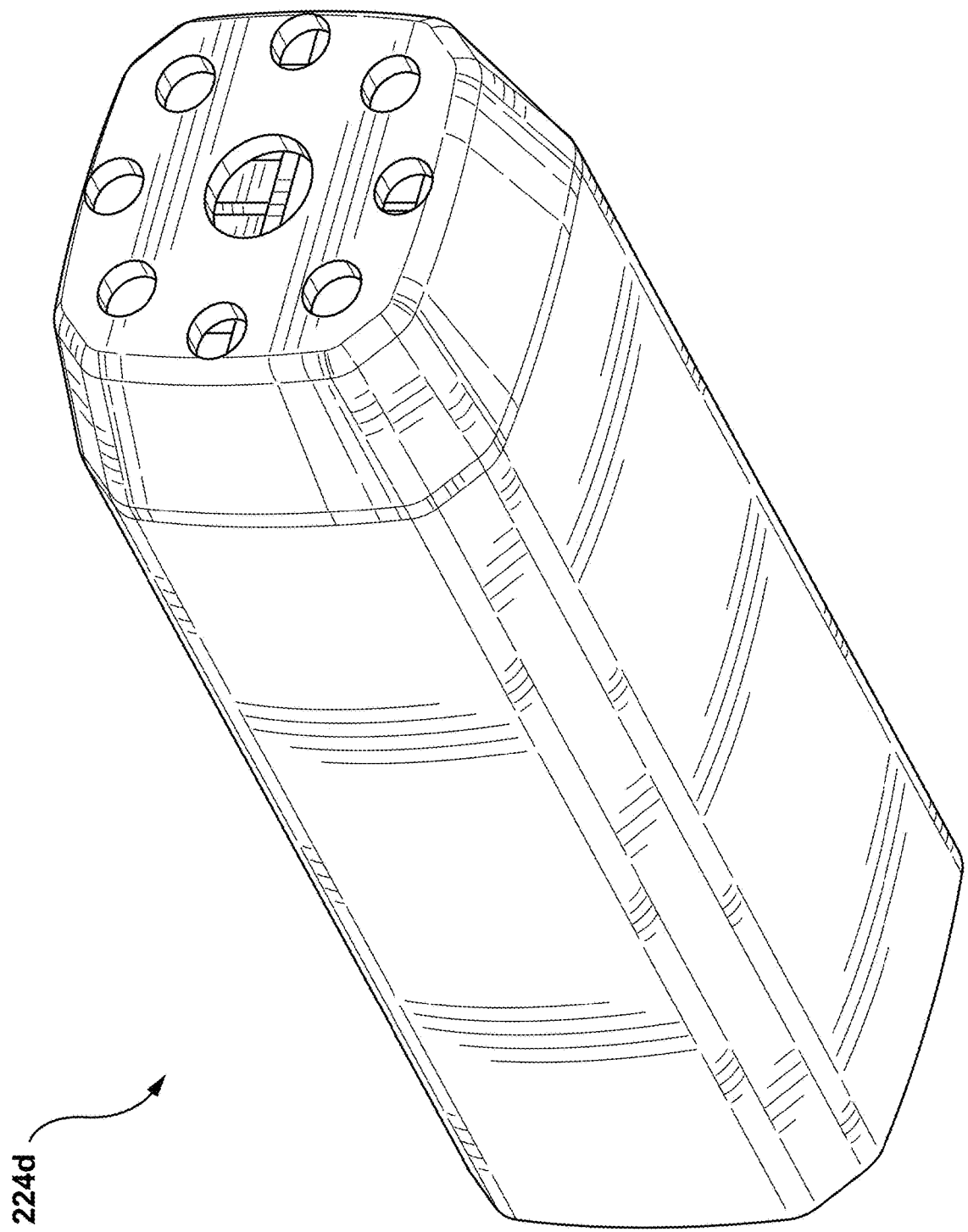
FIG. 13 shows another variant of the sequestering member.

Still further variants are contemplated as, for examples, if it is desired to have a less complex structure, then cylindrical channels 304 may be used instead of a honeycomb structure. FIG. 12 shows another variant sequestering member 224c, which includes only three cylindrical channels 304c. Each of the three channels 304c is made by aligning a plurality of individual cylindrical segments 1204, which collectively comprise a single channel 304c.

Variant sequestering member 224c was made according to the following:

Materials Acquisition:

Magnesium Chloride Hexahydrate ($MgCl_2 \cdot 6H_2O$): Obtain a supply of Magnesium Chloride Hexahydrate. For this prototype, a 5-pound bag was procured from an online marketplace (Amazon).

Magnesium Oxide (MgO) in Powder Form: Acquire Magnesium Oxide in powder form. A quantity of 450 grams was sourced from Amazon.

Olivine Fine Grain Sand: Purchase Olivine fine grain sand. A 10-pound bag was obtained from Amazon, with 1 kilogram used for the prototype.

Preparation of Materials:

Dry Mixing: Combine 1 kilogram of Olivine fine grain sand with 0.3 kilograms of Magnesium Oxide in a dry state. Mix thoroughly to ensure uniform distribution.

Solution Preparation: Dissolve 1 kilogram of Magnesium Chloride Hexahydrate in water, ensuring complete dissolution without exceeding the necessary volume. Aim for a density range of 1.23 to 1.4 kilograms per liter.

Combining Components: Measure 0.3 kilograms of the prepared Magnesium Chloride solution and add it to the previously mixed dry components (Olivine sand and MgO).

Casting and Curing Process:

Mixing and Casting: Mix the combined wet and dry components for approximately one minute to achieve a homogeneous mixture. Cast this mixture into a mold, incorporating small cellulose biodegradable sponges for structural integrity.

Curing: Allow the cast prototype to cure for a duration of two days. The expected outcome is a solid, brick-like form with carbon dioxide absorption properties.

Figure 14:
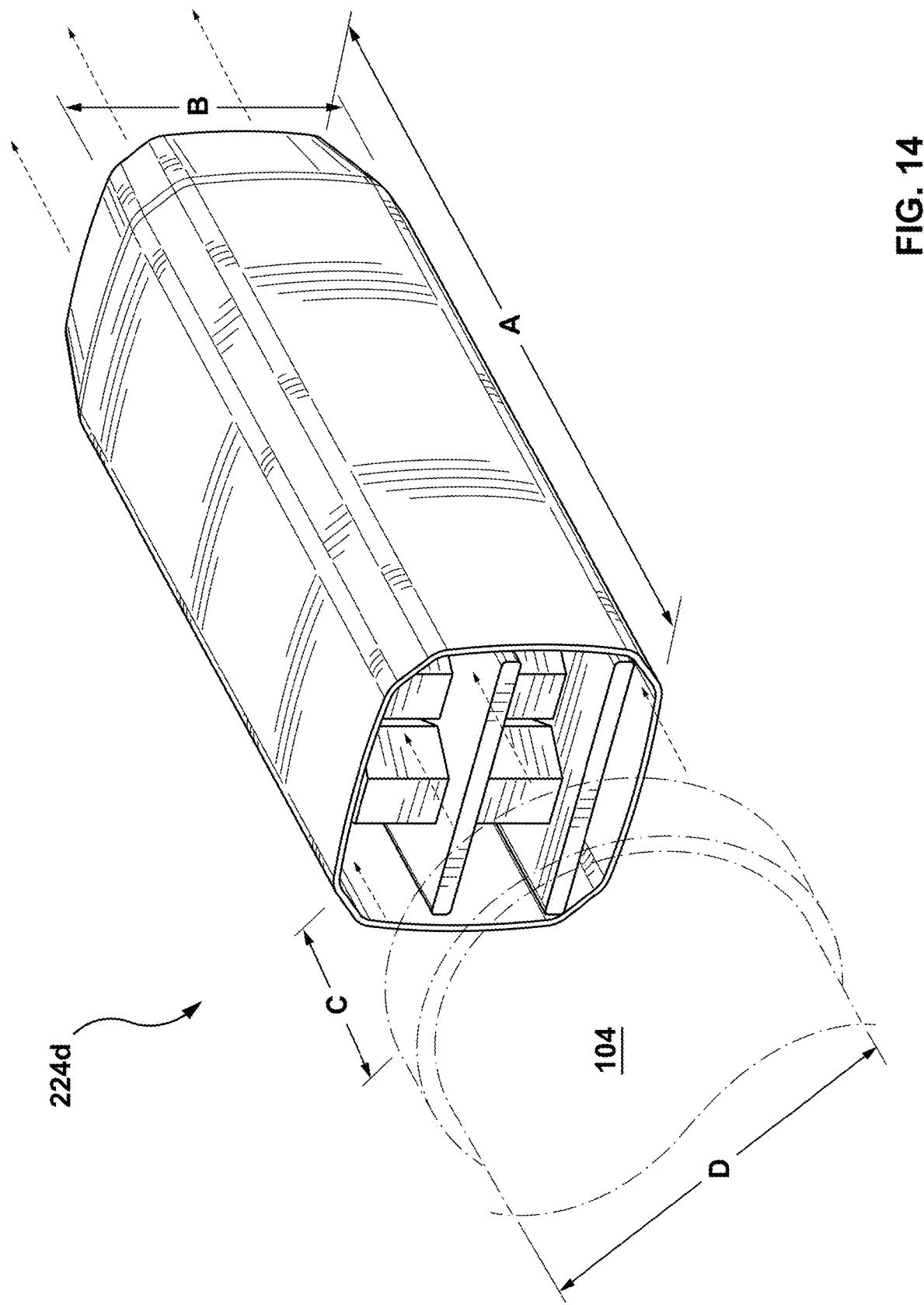
FIG. 14 shows a perspective view of the sequestering member of FIG. 13.
Figure 15:
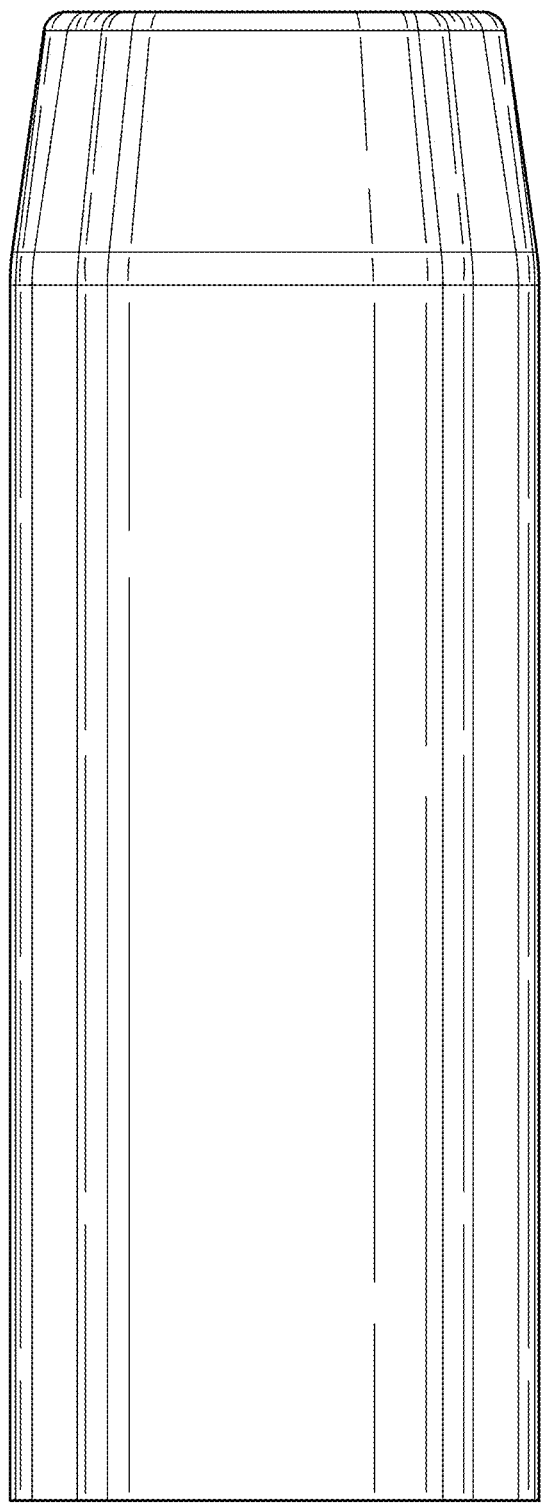
FIG. 15 shows a side view of the sequestering member of FIG. 13.

A still further variant of member 224 is shown in FIG. 13 through FIG. 18 and indicated as member 224d. Member 224d is a working prototype fashioned without household materials. FIG. 14 shows the end of carbon sequestering member 224d that is placed proximal to flue 104. Member 224d, as with others in this specification, contains the stated components of Olivine Sand, Magnesium Oxide, and Magnesium Chloride. There are many ways to form sequestering member 224 and its variants. For example, carbon sequestering member 224d was achieved by employing the shell of two plastic water bottles-one larger than the other. The mixture of the specified materials was poured into the larger bottle with its top removed, while the smaller bottle was inserted into the larger one, pressing the mixture into its form and creating the shell of the device.

Figure 16:
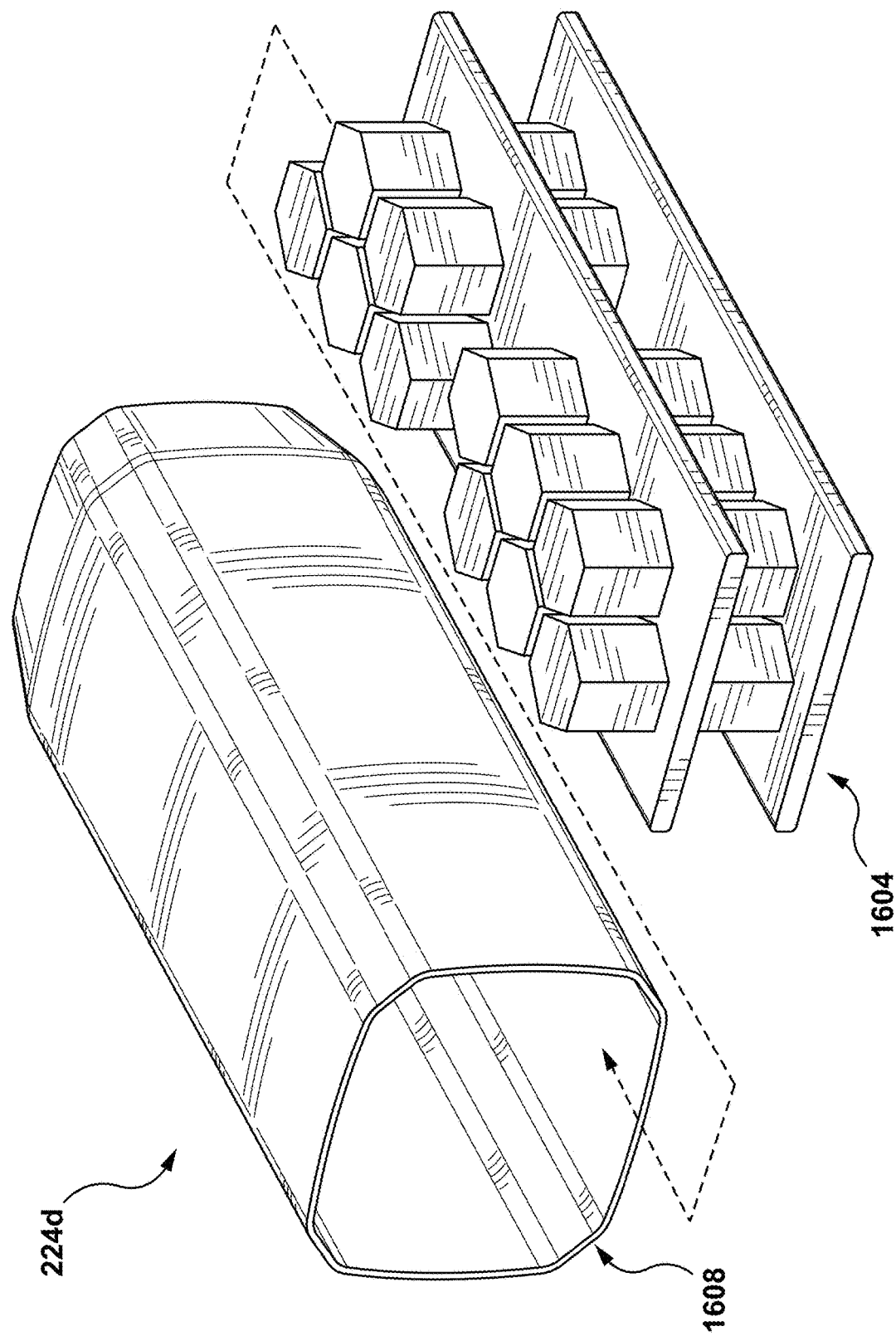
FIG. 16 shows an exploded view of the sequestering member of FIG. 13.
Figure 17:
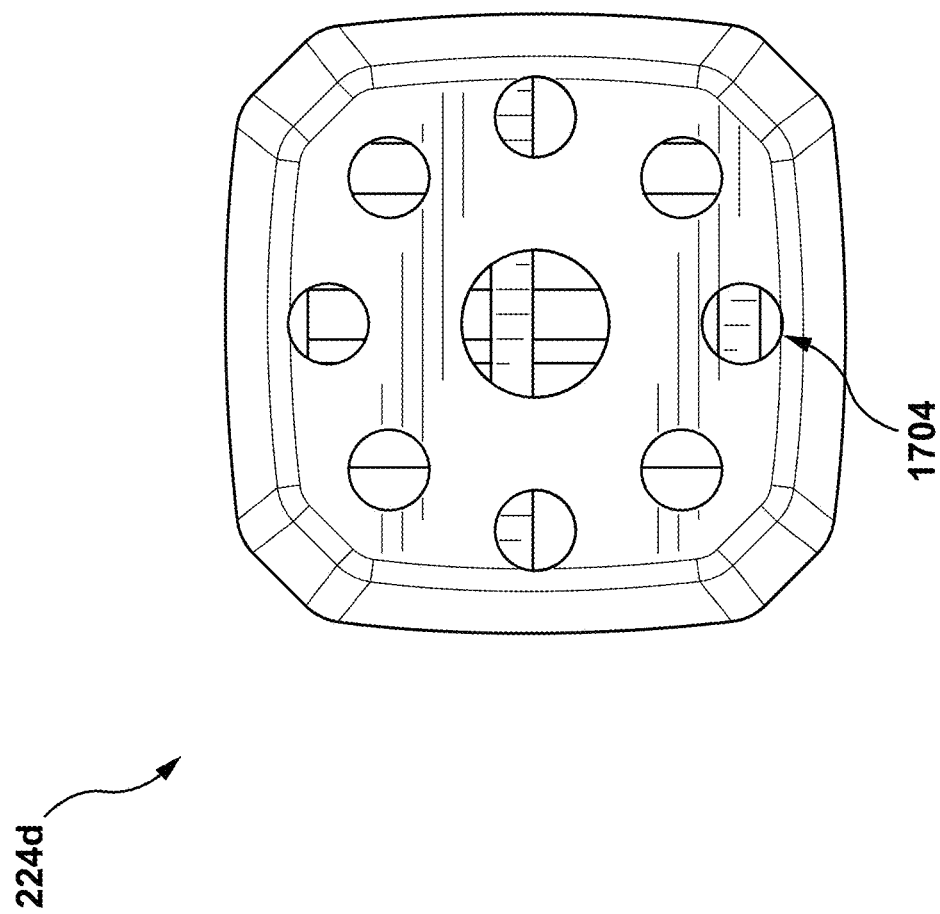
FIG. 17 shows a distal end view of the sequestering member of FIG. 13 from where gases exit.
Figure 18:
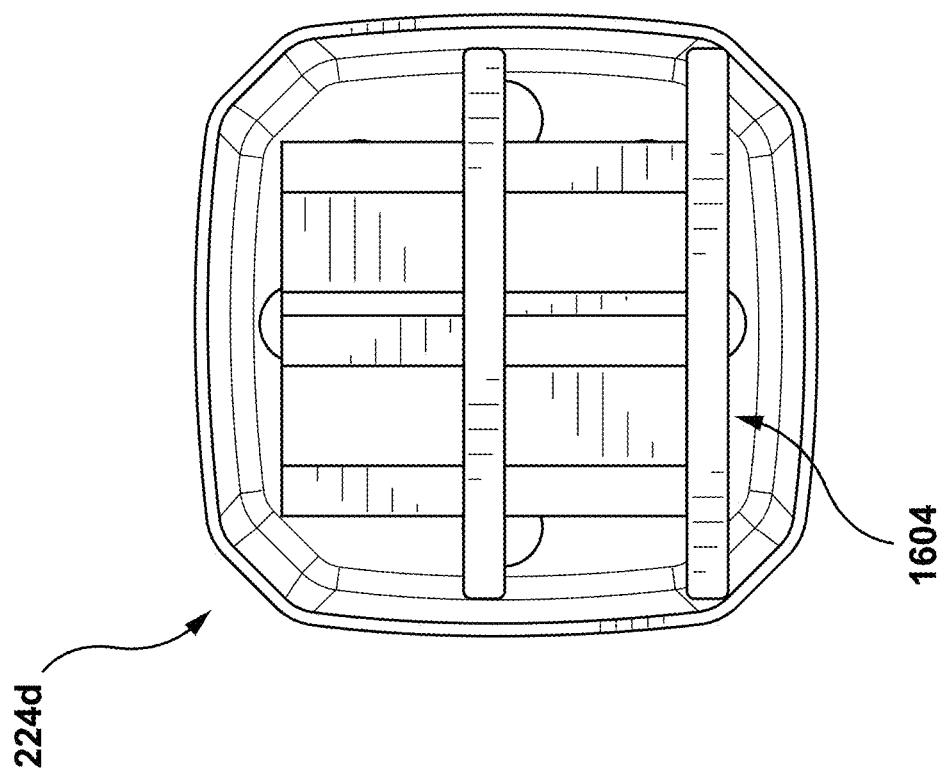
FIG. 18 shows a proximal end view of the sequestering member of FIG. 13, the opposite end shown in FIG. 17, and for placement adjacent to a flue.

As best seen in the exploded view of FIG. 16, the internal structure 1604 of sequestering member 224d was crafted using additional molds including silicon polygonal ice-cube trays to provide a surface area of olivine for carbon sequestration. Once the internal structure 1604 was created it was assembled and inserted into the outer shell 1608

To facilitate the exit of the exhaust gases, the distal end of the sequestering member 224d, was drilled out using masonry drill bits. See exhaust holes 1704 in FIG. 17 of carbon sequestering member 224d, which allows for the egress of exhaust gases while providing exposure to the sequestering materials prior thereto.

As seen in FIG. 14, the sequestering member 224d is designed with specific dimensions to facilitate the sequestration of CO2 from exhaust gases. Dimension A, the length of the sequestering member 224d, is about 7.5 inches. This length corresponds with the time exhaust gases are in contact with the olivine material within the sequestering member, a factor in the sequestration process.

Dimension B, the outer diameter of the sequestering member 224d, measures about 3 inches. This diameter is larger than Dimension D, the diameter of flue 104, which measures about 2.5 inches at its maximum width with the cuff included. The size difference between Dimension B of the sequestering member and Dimension D of the flue is intended to facilitate the entry of exhaust gases into the sequestering member without restricting the flow. Dimension C was about 0.75 inches during the testing discussed below.

The proximal opening of the sequestering member 224d, intended to align with flue 104, has been shaped to accommodate the exhaust flow into the sequestering channels.

The efficacy of a prototype carbon sequestering member 224d was evaluated through a series of tests conducted on Apr. 16, 2024, under clear skies in the Greater Toronto Area with no precipitation and a temperature in the mid-50s Fahrenheit. The tests aimed to measure the carbon dioxide (CO2) levels emitted by a residential water heater both with and without the carbon sequestering device in operation.

Initially, a 15-minute baseline test was conducted without the carbon sequestering member 224d attached while the water heater was running. The CO2 levels recorded during this period were as follows:

Minimum CO2 Concentration: 418 parts per million (PPM)

Maximum CO2 Concentration: 1418 PPM

Average CO2 Concentration over 15 minutes: 760 PPM

Test with Carbon Sequestering Member 224d

Subsequently, the test was repeated with the carbon sequestering member 224d attached to the exterior flue of a water heater. The results from this 15-minute test period demonstrated the carbon sequestering member 224d impact on reducing CO2 emissions:

Minimum CO2 Concentration: 411 PPM

Maximum CO2 Concentration: 1470 PPM

Average CO2 Concentration over 15 minutes: 681 PPM

The data indicates a reduction in the average CO2 concentration from 760 PPM to 681 PPM when the carbon sequestering member 224d is used, showcasing its capability to effectively sequester CO2. The variations in temperature detected by the sensor also highlight the carbon sequestering member 224d responsiveness to operational conditions, further underlining its utility in residential settings.

Further analysis of the test results reveals that the use of carbon sequestering member 224d led to a measurable reduction in CO2 emissions. The average concentration of CO2 was reduced by approximately 10.39%. It can be noted that since this is a prototype, further improvements in carbon sequestering reductions are anticipated with further refinements, such as the application of shroud 208, as carbon sequestering member 224d as tested did not ensure that the entirety of exhaust gases 112 were direct therein. Varying geometries of carbon sequestering member 224d may lead to increased or different surface area exposure and accordingly impact the amount of carbon that is sequestered.

These test results provide empirical evidence supporting the effectiveness of the carbon sequestering member in reducing greenhouse gas emissions from residential sources. The device not only lowers the average concentration of CO2 emitted but does so under typical environmental conditions, making it a practical solution for houseowners aiming to reduce their carbon footprint.

Advantageously, a novel carbon sequestering device is provided. The disclosed carbon sequestering apparatus features a multi-chamber (or multi-channel) construction using granular silica or sand derived from sedimentary rocks, which provides the necessary surface area for effective CO2 binding through weathering. This process involves silicate minerals like olivine reacting with CO2 to form bicarbonate, a reaction that aids in the removal of CO2 from the atmosphere and is a part of enhanced weathering strategies for climate change mitigation. As the apparatus undergoes weathering, it transitions into a lime-based material, which can then be repurposed as a component in concrete production, effectively utilizing the bound CO2 without releasing it back into the atmosphere. Composed of naturally occurring, non-combustible silica or sand, the apparatus also maintains its inert qualities in the event of damage or destruction.

The scope of the monopoly of this specification is defined by the claims, properly construed in relation to the narrative and drawings. Any limiting phrases should not be viewed in isolation but in view of the broader context of the entire teachings and advantages afforded by the specification.

What is claimed is:

1. A carbon sequestering member comprising:
at least one channel having a proximal opening for placement proximal to a flue and having an overall diameter; the proximal opening for receiving exhaust gases;
the at least one channel comprising:
a solid structure formed of olivine sand, magnesium oxide, and magnesium chloride,
wherein a ratio of the solid structure is about 1 kg of olivine sand to about 0.3 kg of magnesium oxide and about 0.3 kg of magnesium chloride; and
a length of the sequestering member that is larger than a diameter of the flue; the length configured to extend the interaction of exhaust gases within the sequestering member; and
an outer diameter of the sequestering member that is larger than a diameter of the flue; the outer diameter configured to increase an entry velocity of the exhaust gases into the sequestering member;
wherein the carbon sequestering member is configured to sequester $CO_2$ traveling along the channel by mineral carbonation such that the exhaust gases exiting through a distal opening opposite the proximal opening have reduced $CO_2$.

2. The carbon sequestering member of claim 1 wherein the olivine is porous.

3. The carbon sequestering member of claim 1 comprising at least three cylindrical channels.

4. The carbon sequestering member of claim 1 comprising a plurality of hexagonal channels.

5. The carbon sequestering member of claim 1 further comprising a shroud for creating a substantially sealed communication channel between the flue and the proximal opening.

6. The carbon sequestering member of claim 5 wherein the shroud includes a base for attaching the shroud to a wall through which the flue exits.

7. The carbon sequestering member of claim 6, wherein the base includes vibration dampening materials to reduce the transmission of mechanical vibrations from the flue to the sequestering member.

8. The carbon sequestering member of claim 1, wherein the channel includes internal structures or coatings that increase the surface area available for $CO_2$ interaction with the olivine.

9. The carbon sequestering member of claim 1, wherein the overall diameter is adjustable to accommodate flues of different sizes.

10. The carbon sequestering member of claim 1, further including a sensor for detecting blockages within the sequestering member.

11. The carbon sequestering member of claim 1, wherein the distal opening includes a filter or catalyst to further reduce pollutants in the exhaust gases other than $CO_2$.

12. The carbon sequestering member of claim 1, additionally configured to sequester pollutants other than $CO_2$, including at least one of nitrogen oxides, sulfur oxides, or particulates.

13. The carbon sequestering member of claim 1, wherein the channel is modular, allowing for the connection of multiple channels to increase the sequestration capacity.

14. The carbon sequestering member of claim 1, wherein the length of the carbon sequestering member measures about 7.5 inches; and the outer diameter of the carbon sequestering member measures about 3 inches.

15. A method of sequestering carbon dioxide ($CO_2$) from exhaust gases emitted by a combustion source, comprising:
positioning the carbon sequestering member of claim 1 proximal to a flue of the combustion source;
directing exhaust gases into the proximal opening of the at least one channel, wherein the proximal opening has an overall diameter complementary to the diameter of the flue;
conducting the exhaust gases through the at least one channel where the $CO_2$ is sequestered by the olivine; and
expelling the exhaust gases through the distal opening of the at least one channel, wherein the expelled gases have reduced $CO_2$ concentration.

16. The method of claim 15, further comprising adjusting the overall diameter of the proximal opening to optimize the flow of exhaust gases into the at least one channel.

17. The method of claim 15, wherein the at least one channel is porous to augment interaction between the olivine and the $CO_2$ in the exhaust gases.

18. The method of claim 15, wherein the carbon sequestering member includes multiple channels configured in either cylindrical or hexagonal shapes, and involves selecting a configuration based on the expected volume of exhaust gases.

19. The method of claim 15, further including integrating a shroud around the proximal opening to create a substantially sealed communication channel between the flue and the proximal opening.

* * * * *